United States Patent
Culbertson et al.

(10) Patent No.: US 11,205,329 B2
(45) Date of Patent: Dec. 21, 2021

(54) HAPTIC DEVICES TO CREATE THE SENSATION OF CONTINUOUS LATERAL MOTION

(71) Applicant: The Board of Trustees of the Leland Stanford Junior University, Stanford, CA (US)

(72) Inventors: Heather Culbertson, Los Angeles, CA (US); Allison M. Okamura, Mountain View, CA (US); Cara M. Nunez, Stanford, CA (US); Sophia R. Williams, Menlo Park, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 16/979,345

(22) PCT Filed: Mar. 15, 2019

(86) PCT No.: PCT/US2019/022550
§ 371 (c)(1),
(2) Date: Sep. 9, 2020

(87) PCT Pub. No.: WO2019/178522
PCT Pub. Date: Sep. 19, 2019

(65) Prior Publication Data
US 2021/0005064 A1 Jan. 7, 2021

Related U.S. Application Data

(60) Provisional application No. 62/644,330, filed on Mar. 16, 2018.

(51) Int. Cl.
*B60Q 1/00* (2006.01)
*G08B 6/00* (2006.01)

(52) U.S. Cl.
CPC ........................ *G08B 6/00* (2013.01)

(58) Field of Classification Search
CPC ... G08B 6/00; A63F 9/24; A63F 13/00; A63F 13/285
See application file for complete search history.

(56) References Cited

U.S. PATENT DOCUMENTS 9,058,714 B2 * 6/2015 Hamlin ............... G07F 17/3202
9,880,621 B2 * 1/2018 Israr ........................ G06F 3/016
(Continued)

FOREIGN PATENT DOCUMENTS

NL  1041425 B1  2/2017

OTHER PUBLICATIONS

Geldard et al., "The Cutaneous "Rabbit": A Perceptual Illusion", 1972, Science v178 pp. 178-179.
(Continued)

*Primary Examiner* — Toan N Pham
(74) *Attorney, Agent, or Firm* — Lumen Patent Firm

(57) ABSTRACT

Haptic illusions of continuous lateral motion across the skin are provided in two distinct ways. The first approach is to provide a discrete array of tactors and drive them to provide normal forces to the skin in a sequential pattern along the array of tactors. The second approach is to provide a discrete array of tactors that each provide both normal and lateral forces to the skin in a sequential pattern along the array of tactors. In both cases, the result is a perceived motion of a contact point across the skin, occurring along the length of the factor array.

15 Claims, 11 Drawing Sheets

(56) References Cited

U.S. PATENT DOCUMENTS

| | | |
|---|---|---|
| 10,772,394 B1 * | 9/2020 | Michalske ............... A44C 5/14 |
| 2009/0184923 A1 * | 7/2009 | Schena ............... G06F 3/03543 |
| | | 345/156 |
| 2011/0248837 A1 | 10/2011 | Israr |
| 2012/0206371 A1 | 8/2012 | Turunen |
| 2015/0035658 A1 | 2/2015 | Provancher |
| 2016/0008206 A1 | 1/2016 | Devanaboyina |
| 2016/0086457 A1 | 3/2016 | Baron |
| 2016/0216765 A1 | 7/2016 | Levesque |

OTHER PUBLICATIONS

Israr et al,, "Tactile Brush: Drawing on Skin with a Tactile Grid Display", 2011, CHI conference, p. 2019.

Jones et al., "Tactile display and vibrotactile pattern recognition on the torso", 2006, Advanced Robotics v20n12, pp. 1359-1374.

Kang et al, "Smooth Vibrotactile Flow Generation Using Two Piezoelectric Actuators", 2012, IEEE Trans. Haptics v5n1, pp. 21-32.

Seo et al., "Perceptual Analysis of Vibrotactile Flows on a Mobile Device", 2013, IEEE Trans. Haptics v6n4, pp. 522-527.

Yang et al., "Sensory Saltation and Phantom Sensation for Vibrotactile Display of Spatial and Directional Information", 2012, Presence v21n2, pp. 192-202.

* cited by examiner

HAPTIC DEVICES TO CREATE THE SENSATION OF CONTINUOUS LATERAL MOTION

FIELD OF THE INVENTION

This invention relates to haptic displays, which may be wearable.

BACKGROUND

It is generally desirable for haptic devices to provide various kinds of touch sensations. One particularly challenging sensation to provide with haptic devices is a continuous stroking motion. Directly simulating such a motion with a single actuator tends to require very large and complex actuators. E.g., a single actuator that could directly provide a six inch arm stroke motion would be a formidable piece of machinery. So attention has turned to providing such sensations by relying on haptic illusions. For example, workers in the art have created haptic illusions of stroking motions using an array of tactors driven with vibrations (e.g., Israr et al., "Tactile Brush: Drawing on skin with a tactile grid display", 2011, Computer-Human Interaction conference, pp 2019-2028).

SUMMARY

Vibrotactile actuators as used in the above-cited work can create the illusion of a moving tactile sensation, but cannot mimic the feel of a physical object moving across the skin due their input energy being provided at frequencies well above what would be the frequencies occurring during interactions with real-world objects. Accordingly, we have investigated the use of non-vibratory haptic signals to provide illusions of continuous motion, with promising results as described below.

In this work, haptic illusions of continuous skin stroking are provided in two distinct ways. The first approach is to provide a discrete array of tactors and drive them to provide normal forces to the skin in a sequential pattern along the array of tactors. The second approach is to provide a discrete array of tactors that each provide both normal and lateral forces to the skin in a sequential pattern along the array of tactors. In both cases, the result is a perceived stroking motion along the length of the tactor array.

DETAILED DESCRIPTION

Section A briefly describes general principles relating to various embodiments of the invention. Section B describes an experimental demonstration of generating a haptic illusion of continuous stroking with actuators that provide normal forces to the skin. Section C describes an experimental demonstration of generating a haptic illusion of continuous stroking with actuators that provide both normal and lateral forces to the skin.

A) General Principles

Figure 1:
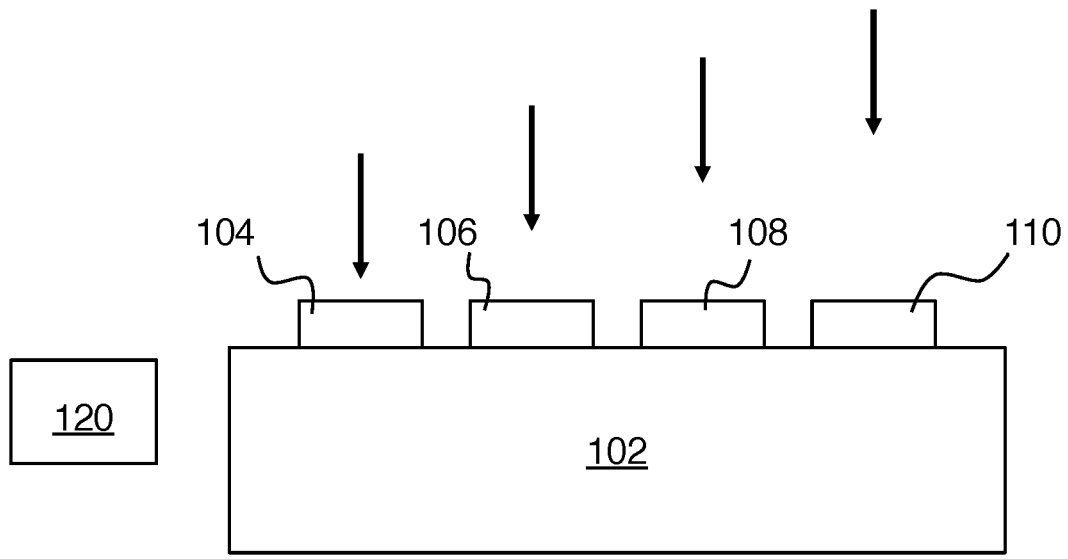
FIG. 1 shows an exemplary embodiment of the invention.

FIG. 1 schematically shows the operating principle of a first embodiment of the invention. In this example, tactors 104, 106, 108 and 110 are disposed on skin 102 of a user. These tactors are sequentially driven to provide normal forces to the user's skin to generate the sensation of continuous lateral motion along a length of the linear array of tactors, as schematically suggested by the staggered vertical force arrows on FIG. 1. Section B describes experiments relating to this concept in detail.

Accordingly, an exemplary embodiment of the invention is a haptic feedback apparatus for providing a sensation of continuous lateral motion. Here the apparatus includes a linear array of three or more tactors (e.g., 104, 106, 108, 110 on FIG. 1), where each tactor is configured to provide a normal force to a user's skin. The apparatus also includes a tactor controller 120 configured to provide drive signals to the tactors to generate the sensation of continuous lateral motion along a length of the linear array of tactors. Here the connections between the tactor controller and the tactors are not shown, for simplicity of illustration.

Here a normal force to a user's skin is defined as a force that tends to indent the user's skin. The vector direction of such a force is parallel to the surface normal vector of the user's skin at the location the force is applied.

In a preferred embodiment, each tactor in its resting position is in contact with the user's skin, and the actuation profile of each tactor includes an initial retraction of the actuator away from the user's skin followed by a stimulus motion of the tactor. Position vs. time of the stimulus motion can be any function of time (e.g., linear or quadratic). A quadratic function of time (t) is any function of the form $at^2+bt+c$, with a, b, c being predetermined constants. A linear function of time is any function of the form $bt+c$ with b, c being predetermined constants.

A delay between actuation of adjacent tactors can be between 0% and 50% of the actuation profile duration. The actuation profile duration is between 0.1 s and 1 s. An actuation profile is the position vs. time function of a tactor when it is being actively driven. In this work individual tactors are usually in a resting state, and are only driven according to their actuation profiles intermittently. Therefore such actuation profiles have well-defined durations.

Figure 2:
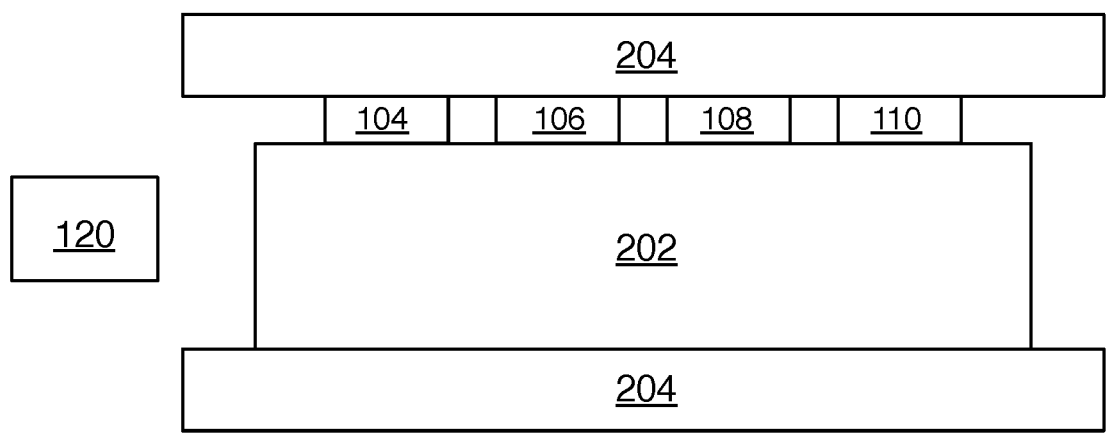
FIG. 2 shows another exemplary embodiment of the invention.

The haptic feedback apparatus can further include a wearable elastic member configured to hold the linear array of tactors in contact with the user's skin during operation. FIG. 2 shows an example, where tactors 104, 106, 108, 110 are held in contact with a user's arm 202 by sleeve 204.

Figure 3:
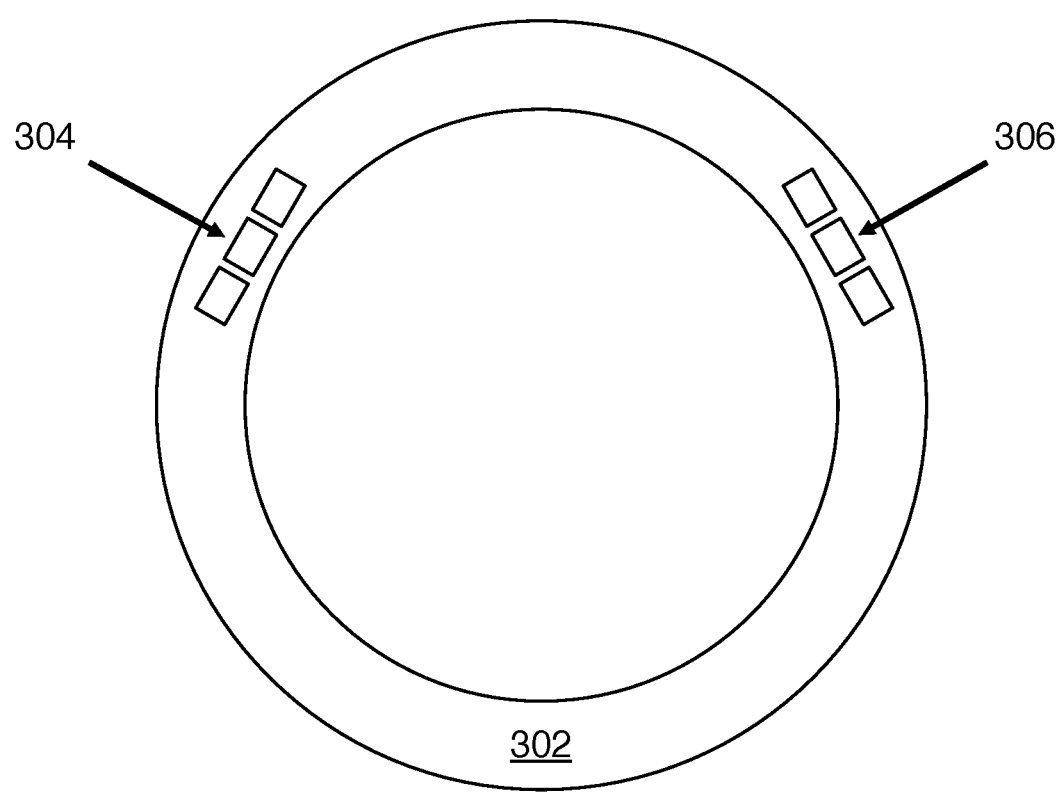
FIG. 3 shows an example of embedding haptic devices in a vehicle steering wheel.

Alternatively, the haptic feedback apparatus can be configured to be installed in an object the user will hold or make contact with in operation. FIG. 3 shows an example, where haptic displays 304 and 306 according to principles described herein are embedded in a steering wheel 302.

The tactor controller can be configured to provide vibratory drive signals to the tactors in addition to the above-described forces. Here we distinguish between vibrations and forces according to frequency or repetition rate. Forces as described above preferably have a repetition rate of 20 Hz or less, while vibrations have a frequency range from 50 Hz to 1000 Hz. Thus the repetition rate of the drive signals is preferably 20 Hz or less.

A second exemplary embodiment of the invention is a haptic feedback apparatus for providing a sensation of continuous lateral motion. Here the apparatus includes a linear array of three or more tactors (e.g., 902, 904, 906, 908, 910 on FIG. 9), where each tactor is configured to provide both normal and lateral force to a user's skin. The apparatus also includes a tactor controller 920 configured to provide drive signals to the tactors to generate the sensation of continuous lateral motion along a length of the linear array of tactors. The tactor configuration at several times is shown in order to illustrate the operating concept. Here also the connections between the tactor controller and the tactors are not shown, for simplicity of illustration.

A lateral force to the user's skin is defined as a force that tends to laterally drag the skin. The vector direction of such a force is perpendicular to the surface normal vector of the user's skin at the location the force is applied. A tactor that applies both a normal and lateral force to the skin applies a force that can be resolved (in a vector sense) into a normal force and a lateral force as defined above.

Figure 11:
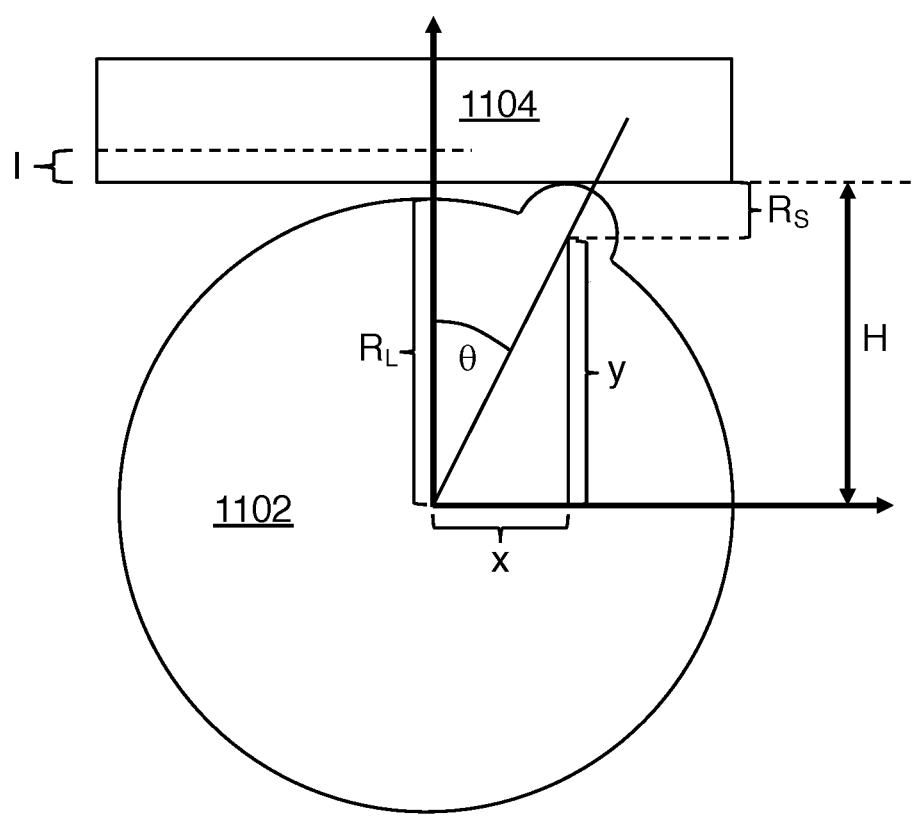
FIG. 11 shows the geometrical parameters for the analysis of the experiments of section C.

Each tactor can be configured as a rotatable cylinder with a ridge on it, and rotation of the rotatable cylinder can bring the ridge into contact with the user's skin to provide both normal and lateral force to a user's skin. For example, FIG. 11 shows a tactor 1102 configured to provide such forces to skin 1104 via rotation.

The delay between actuation of adjacent tactors can be between 0% and 50% of an actuation profile duration. The actuation profile duration can be between 0.1 s and 3 s. Here also the repetition rate of the drive signals is preferably 20 Hz or less. Here the actuation profile is defined to start when the ridge makes contact with the skin and ends when the ridge ceases to make contact with the skin, as the cylinder rotates.

For tactors that are ridges on rotatable cylinders, actuation only occurs when the ridge is in contact with the skin, so the delay between actuations can be expressed as a fraction of the rotation period of the cylinders. In cases where all cylinders are rotated simultaneously, the delay between actuations is determined by the relative phases of the ridges on the cylinders at any one time.

B) Experimental Demonstration—Normal Forces

B1) Introduction

Touch is the primary nonverbal means of communication of emotion between humans. Both our physical and emotional well-being relies on human-human touch, yet most computer-mediated interactions currently lack rich, meaningful touch signals. The inability to transmit touch during interpersonal communication leads to a limited feeling of social presence during virtual interactions between people, motivating the design of haptic systems to deliver virtual social touch cues. This requires an understanding of the characteristics of social touch, leading to the design and selection of control parameters for haptic systems to emulate social touch.

Humans sense touch through specialized cells known as mechanoreceptors, which are embedded in the skin. Each mechanoreceptor senses and responds to a specific form of haptic stimulus: Pacinian corpuscles respond to high-frequency vibrations, Meissner corpuscles sense the rate of skin deformation, Merkel disks detect spatial features, and Ruffini endings sense skin stretch. The presence and distribution of mechanoreceptors differs in hairy and non-hairy skin. Recent research has shown that an additional mechanoreceptor, the C tactile (CT) afferent, exists in hairy skin and selectively responds to stroking motions. The CT afferents respond maximally to stroking in the range of 1-10 cm/s, which has also been shown to be the most pleasant range of velocities for stroking on the skin. Results from a previous study indicated that stroking was a common gesture for conveying love, sympathy, and sadness. Previous studies have also shown that individuals can successfully differentiate emotions when expressed solely through touch. This result shows promise for the field of social haptics, which seeks to convey or elicit emotions through artificial means.

Many haptic devices previously designed for social touch seek to replicate a specific interaction or gesture, such as a hug or handshake. Other social haptic systems make use of mediated social touch to transmit touch signals from one user to another over a distance. In mediated social touch, the output signal can either be a direct replication of the input signal or a mapping between different modalities (i.e. force input to vibration output). A key component of social haptic devices is the design of the output hardware to display the social touch cues to the user. Previous researchers have shown that vibrations, thermal displays, and air puffs can be used to elicit an affective response, even though these modalities do not directly stimulate the CT afferents. In this section, we focus on the creation of a stroking sensation on the arm both to selectively activate the CT afferents and to recreate a common social touch gesture, e.g. using voice coil motors.

Many previous social devices have been designed for creating a stroking sensation using a range of different modalities of haptic stimulation. Several researchers have explored directly stimulating the skin using lateral motion generated by a servo motor and by parallel bars controlled by shape memory alloy actuators. A stroking sensation has also been created through indirect contact with the skin using an air jet. The illusion of motion across the skin can also be created using vibration, which has been used to simulate a stroking sensation in a social haptic device. However, there has been limited investigation into the use of normal force in the creation of a stroking sensation.

We present the design of a novel wearable haptic device, e.g. for creating a stroking sensation on the arm. An exemplary device includes a linear array of voice coils, which are used to sequentially indent the arm. Section B2 presents the design and control of the device, and Section B3 evaluates the continuity and pleasantness of the stroking sensations created by the device in a human-subject study.

B2) Wearable Device Design

This section describes the design and actuation of a wearable device for creating the sensation of lateral motion up the arm using only normal indentation. We begin by describing how this sensation was first prototyped using haptic sketching. We then present the final hardware design and actuation signals.

B2a) Haptic Sketch Prototype

We explored a variety of methods for creating the sensation of lateral motion on the skin by creating simple hand-actuated mechanical prototypes. These prototypes were created following the principles of haptic sketching, which were introduced by Mousette. The goal of haptic sketching is to rapidly prototype haptic devices and effects with an emphasis on iteration rather than technical complexity. We used readily available materials that are easy to work with. We designed ten haptic sketches that used no electrical components and required the user to manually stimulate the skin using the device.

The haptic sketch that created the most pleasant and continuous sensation of lateral motion up the arm was a linear array of magnets attached to the arm using Velcro straps, which displayed a distributed pattern of normal force. The permanent magnets on the skin were all oriented with their north pole upwards, and we used a second permanent magnet oriented with its north pole downwards to repel the magnets into the skin. We held the free magnet above the array and manually scanned the free magnet across the array, sequentially pressing the other magnets into the skin. A single magnet created a more localized contact point that felt similar to a finger dragging on the arm. Two magnets created a wider contact area, which felt more like several fingers or the whole hand dragging on the arm.

B2b) Electro-Mechanical Hardware

The success of the haptic sketch with magnets showed that the concept of using normal indentation to create the sensation of lateral motion up the arm was a promising direction. We expanded on this idea to create an electro-mechanical prototype of the system to allow us to easily vary the system's behavior and determine which parameters created the most pleasant and continuous sensation.

We measured the amount of normal force each magnet exerted on the arm in the sketch prototype to be in the range of 1-2 N. This level of force was both perceptible and comfortable on the arm. In a previous study, researchers experimentally determined that 1 N of force generated with magnetic repulsion would be sufficient for effective normal stimulation. Thus, we selected our actuator such that it produced the minimum 1 N of normal force to be effective, and could consistently produce 1-2 N of normal force such that the sensation would be pleasant.

To maximize our design for wearability, the actuator used is preferably small and lightweight. Creating a wearable device is important to enable the natural arm postures used in the device evaluation in Section B3. We do not address mobility in this work, which is ultimately limited by the power required by the actuators. In addition to being small in diameter to maximize the spatial resolution of the device, the actuator preferably also has a low profile so the device is not unwieldy and does not encumber the user's motion. The actuator preferably has a reasonable stroke length so as to be easily perceptible by the user.

We chose a voice coil (Tectonic Elements TEAX19C01-8) actuated at low frequencies (<5 Hz) to apply pressure directly to the skin because we could directly control the amount of skin deformation. Although this actuator has a large diameter (33 mm), which limits spatial resolution, it has a low vertical profile (12.8 mm) and reasonable mass (29 g) to be used in a wearable device. In our tests, we measured a stroke of ≈4 mm at the actuator's maximum rated current. This stroke is above the 1.5 mm depth of skin indentation shown to be consistently and accurately perceived by a user, so we believe that this stroke length is sufficient for our device.

B2c) Wearable Device

We created a linear array of voice coils to display indentation forces distributed in both location and time. Our design constraints in creating a method for attaching the voice coils to the arm were that the device should be lightweight, be comfortable to wear, not impede motion, be adjustable to fit different sized arms, and not substantially affect the signal displayed by the actuator. We tested both rigid and flexible systems and determined that a flexible mounting system resulted in the most strongly perceived indentation sensations.

We designed and built an actuator sleeve. The sleeve is made of elastic fabric for comfort and adjustability. During our initial tests of the sleeve, we determined that it was important for the portion of the sleeve directly above the actuators to be inelastic so that the force from the actuators is directed downwards. If this portion is elastic, the actuators would move upwards and stretch the fabric such that the force the user feels is significantly decreased. To prevent this, an inelastic, but flexible, canvas patch was added down the middle of the sleeve. Velcro was added to attach the sleeve to the user's arm and to adjust the sleeve to fit differently sized arms. The sleeve can either be attached to the forearm or the upper arm.

By default, the voice coils have a thin annular ring on the portion that contacts the skin. This contact can be uncomfortable and leads to less natural and pleasant sensations. We added a thin polypropylene cover to the tactor to create consistent contact and evenly distribute the force to the skin. The outside of the voice coils were covered in sleeves made of electrical rubber tape to thermally and electrically insulate the actuators from the user's skin.

B2d) Indentation Actuation Signals

The array of voice coils creates the sensation of a stroke up the arm by sequentially indenting the actuators into the arm. The stroke sensation can be controlled by varying the duration of the indentation (pulse width) and the amount of delay between the onset of indentation for adjacent actuators.

Figure 4A:
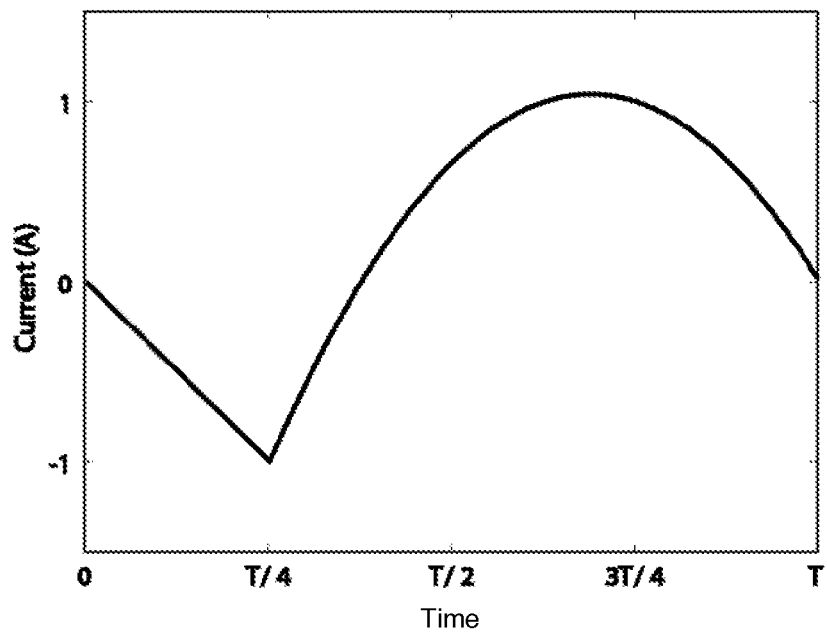
FIGS. 4A-B show exemplary actuation profiles for normal forces.
Figure 4B:
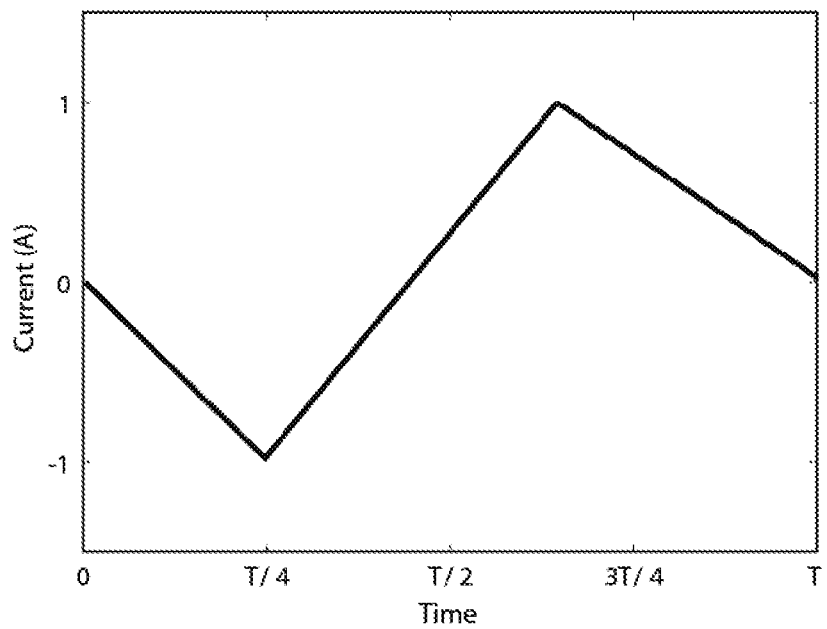

When the actuator sleeve is worn on the arm, the tactors are always in contact with the skin. Our tests with the voice coils demonstrated that in order to create a strong normal force sensation, the tactor is preferably first retracted from the skin before the indentation. This retraction creates a longer effective stroke and results in a more noticeable indentation. FIG. 4A shows the tactor profile used in these experiments. After the tactor is retracted, it is indented into the skin following a quadratic profile with the equation:

$$I(t) = a_{vc}\left(-\frac{32}{3T^2}t^2 + \frac{44}{3T}t - 4\right) \quad (A1)$$

where I is the current sent to the actuator, $a_{vc}$ is the maximum current, T is the pulse width, and t is the time elapsed since the beginning of the indentation. This quadratic profile was fit by setting the beginning and ending current values ($I(T/4)=a_{vc}$, $I(T)=0$). Other stimulus profiles can also be used, such as the linear stimulus profile of FIG. 4B.

Figure 5A:
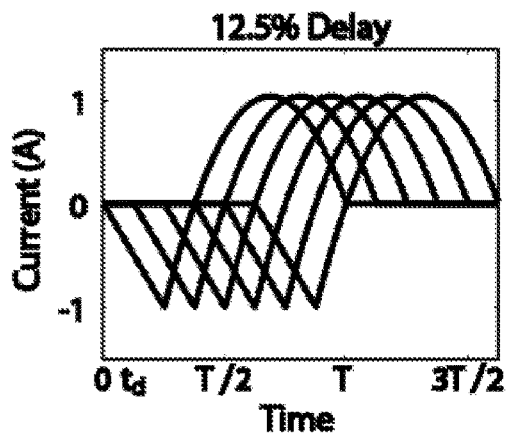
FIGS. 5A-B show the effect of delay on the experiments on section B.
Figure 5B:
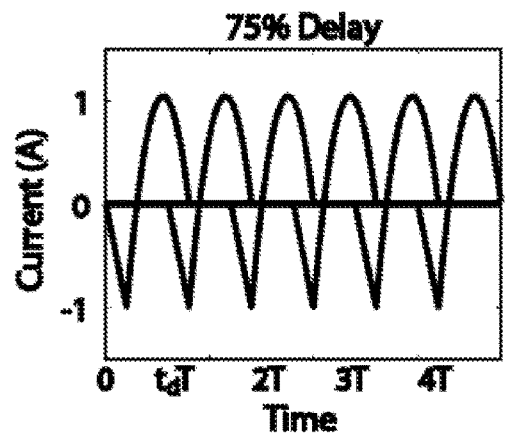

The actuators in the array are sequentially activated using the same signal with a set amount of delay between the onset of the indentation for adjacent actuators. The effect of this delay can be seen in FIGS. 5A-B. The signals on FIG. 5A are delayed by 12.5% of the pulse width, which results in indentations that significantly overlap. The signals on FIG. 5B are delayed by 75% of the pulse width, which results in indentations that are more disconnected. We study the effects of this delay between actuators on the perceived continuity and pleasantness of the stroke in Section B3.

The voice coils are driven using an analog signal from a Sensoray 826 PCI card. Each voice coil is driven by a separate analog output pin on the Sensoray board, and the signals are updated at 1000 Hz. The signals are then passed through a custom-built linear current amplifier using a power op-amp (LM675T) with a gain of 1 A/V. The maximum current sent to the voice coils is limited to 1 A so as not to exceed their maximum rated power of 3 W RMS. The voice coils produce some sound when actuated, although the overall sound level is low.

B2e) Vibration

Figures 6A, 6B:
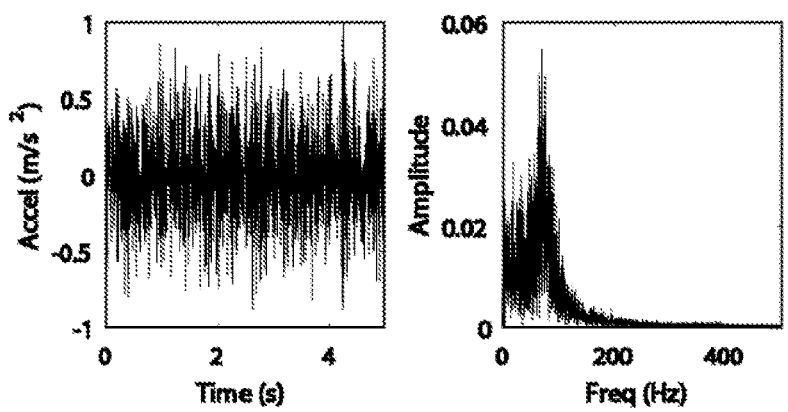
FIGS. 6A-C show vibrations as employed in some of the experiments of section B.
Figure 6C:
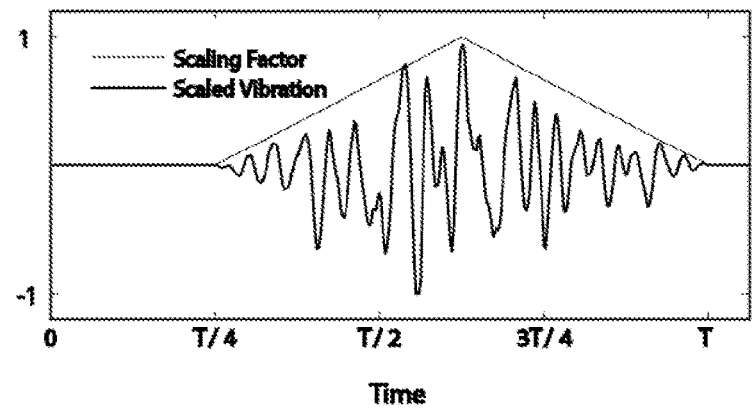

Dragging contact on skin generates vibrations in addition to normal and tangential forces. Therefore, we added vibrations that more closely matched the vibrations generated from skin-skin contact. Borrowing from the approach of texture vibration modeling, we overlaid vibrations recorded from a leather sample that was included in the Penn Haptic Texture Toolkit. The vibration signal and frequencies are shown in FIGS. 6A-C. Here FIG. 6A shows acceleration vs. time for a typical vibration signal, and FIG. 6B is a corresponding frequency spectrum.

Previous research has shown that vibrations alone can be used to create the sensation of lateral motion. We tested different vibration scaling patterns to find which one created the most realistic and pleasant sensations. Playing constant amplitude vibration during the indentation phase created a pleasant sensation, but it felt artificial and reduced continuity. The most successful scaling pattern was the linear pattern shown in FIG. 6B. The amplitude of the vibration was increased while the actuator was moving downward into the skin, and decreased while the actuator was moving upward away from the skin. This pattern felt pleasant and created the sensation of flow up the arm when played alone without the indentations.

The amplitude of the vibrations altered their effect on the continuity, pleasantness, and realism of the interaction. Higher amplitude vibrations created a larger increase in continuity, but degraded pleasantness and made the interaction feel more artificial. Lower amplitude vibrations were ultimately chosen because they still created a perceivable flow sensation, but did not create the same sense of artificiality of the higher amplitude vibration. The output vibrations were scaled to have a maximum current of 50 mA.

B3) User Study

To determine which actuation parameters created the most continuous motion up the arm, as well as which parameters created the most pleasant sensation for the user, we performed a human-subject study under a wide range of actuation conditions. Sixteen participants (15 right-handed, 1 left-handed; 6 male, 10 female) participated in the study. Five of the participants had prior experience with haptic devices and eleven did not. The protocol was approved by the Stanford Institutional Review Board, and all subjects gave informed consent.

B3a) Methods

Participants in the study sat at a table. They wore headphones playing white noise to block sounds produced by the actuators.

Participants completed the study in two phases: one phase wearing the device on the lower arm, and one phase wearing the device on their upper arm. The order of the two phases was randomly determined for each participant, and the order was balanced amongst all participants.

In the study, we varied the pulse width (200 ms, 400 ms, 600 ms, 800 ms), amount of delay between actuators (12.5%, 25%, 37.5%, 50%, 62.5%, 75% of pulse width), and the presence or absence of vibration. These parameters resulted in 48 unique actuation conditions, which were repeated twice. The order of conditions was randomized, and participants completed all 96 trials for a device location before switching to the next location. On average, participants completed the study in under 45 minutes.

In the study, participants felt each actuation sequence one at a time. After each sequence, they were asked to rate it on its perceived continuity and pleasantness. Participants rated continuity on a 7-point Likert scale where 1=Discrete and 7=Continuous. They rated pleasantness on a Likert scale ranging from −7 to +7 where negative numbers corresponded to an unpleasant sensation and positive numbers corresponded to a pleasant sensation (−7=Very Unpleasant, 0=Neutral, +7=Very Pleasant).

B3b) Results

Figure 7:
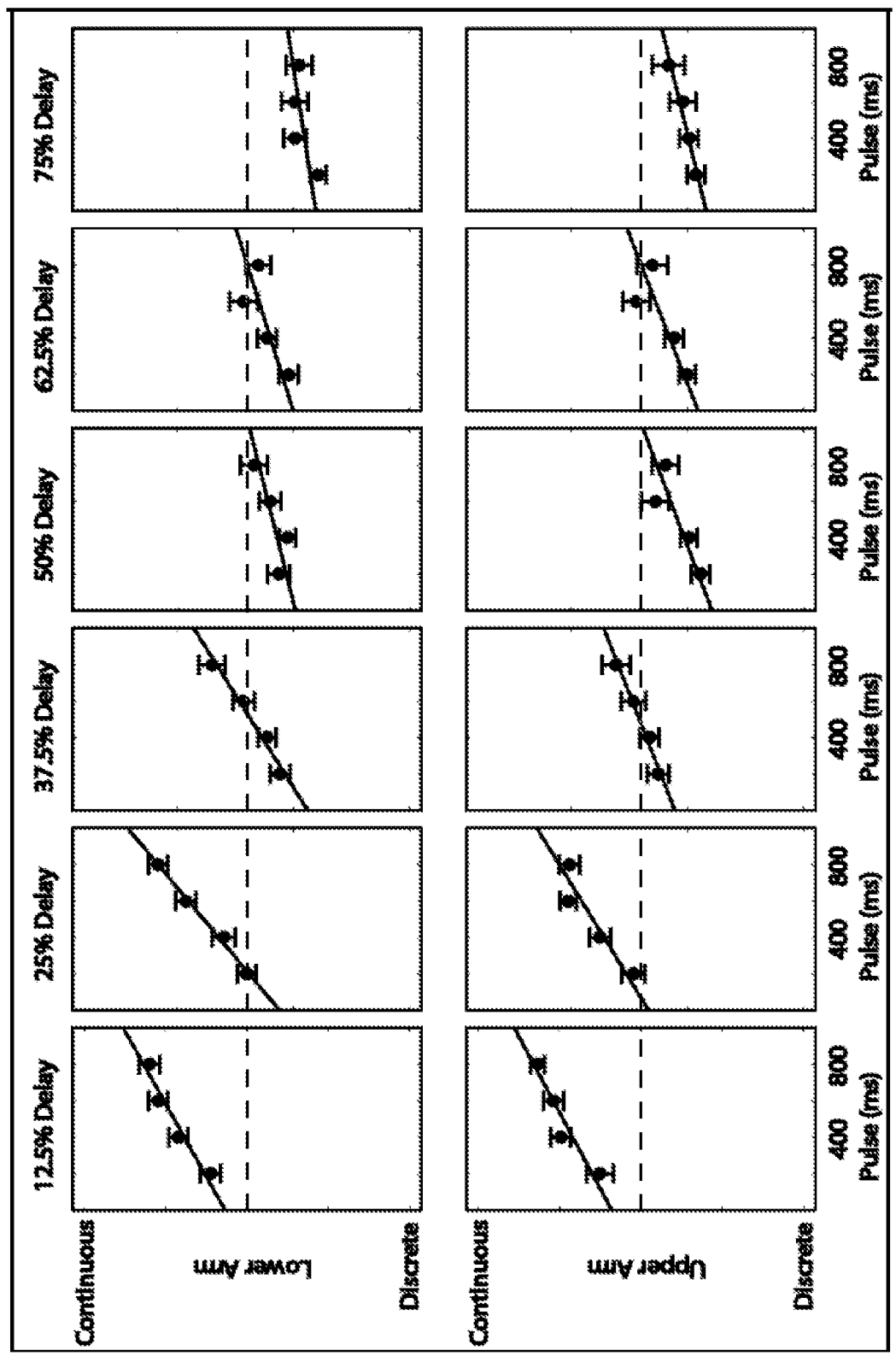
FIG. 7 shows continuity results for the experiments of section B.

FIG. 7 shows the average continuity rating across all subjects, separated by delay and pulse width. We performed a linear regression for the average continuity ratings for each delay value. The positive slopes for all fit regressions indicates that rated continuity increases with pulse width when delay is held constant. Additionally, the continuity decreases with delay, as shown by the combination of generally decreasing intercept values and slopes of the regressions.

We ran a four-way repeated measures ANOVA on the continuity ratings with arm location, vibration presence, delay, and pulse width as factors. This analysis showed that continuity ratings were statistically higher for the lower arm than the upper arm ($p=0.025$). Continuity was also significantly lower for the no-vibration condition than when vibration was played ($p=6.08 \times 10^{-5}$), which shows that playing the vibration does improve the continuity of the sensation.

Continuity ratings were statistically different for all pairs of delays ($p<0.002$) except between 50% and 62.5% ($p=0.20$). Continuity ratings were statistically different for all pairs of pulse widths ($p<2\times 10^{-5}$) except between 600 ms and 800 ms ($p=0.070$). These results show that continuity can be directly controlled by changing the delay between actuators and the duration of an individual actuator pulse.

Figure 8:
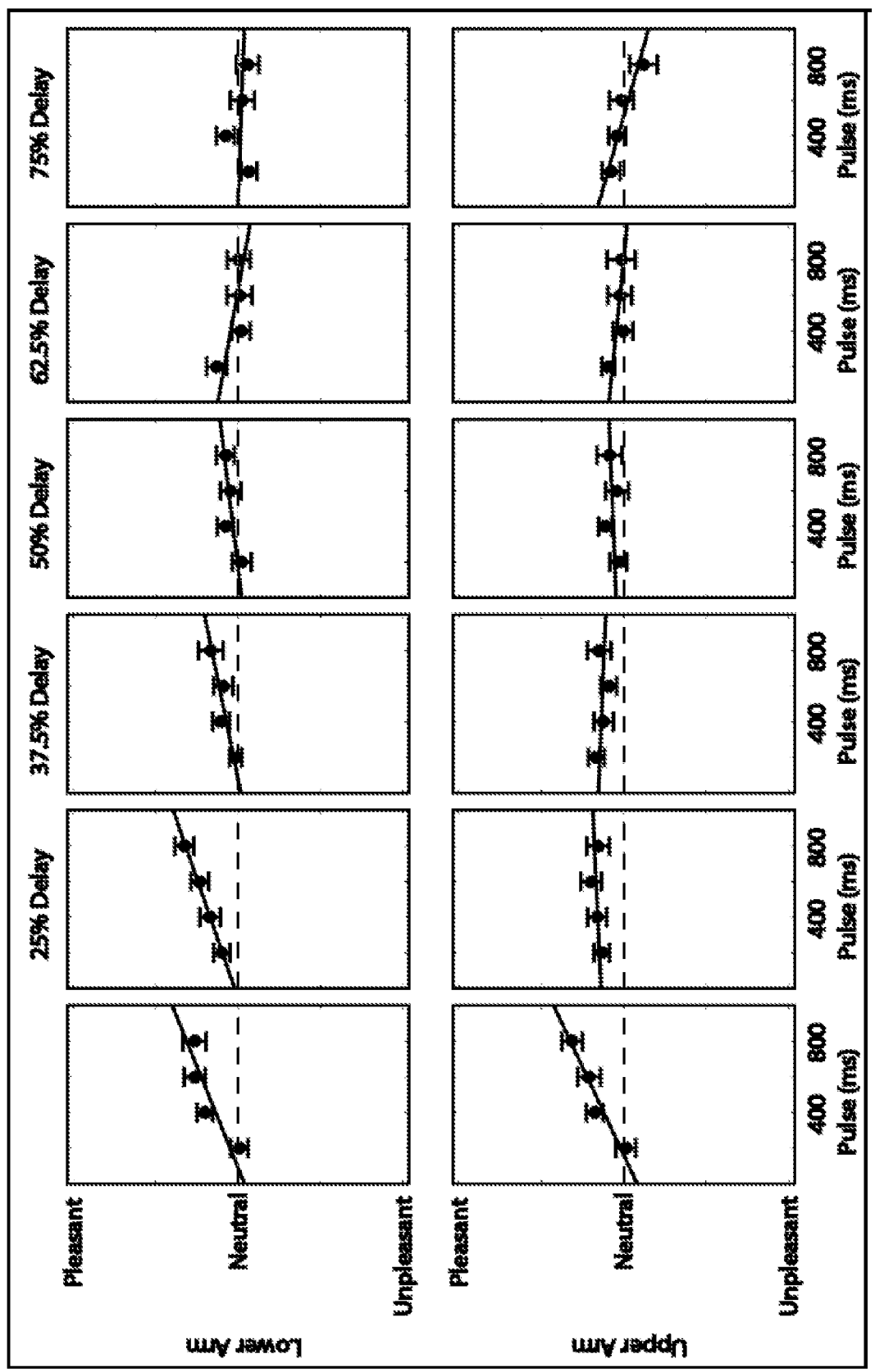
FIG. 8 shows pleasantness results for the experiments of section B.

FIG. 8 shows the average pleasantness rating across all subjects, separated by delay and pulse width. For low delay values (12.5% and 25%), the rated pleasantness increases with pulse width when delay is held constant, as shown by the positive slopes in the linear regressions. However, at high delay values (62.5% and 75%), the rated pleasantness decreases with pulse width, as shown by the negative slopes in the regressions. This decrease in pleasantness was also indicated in post-experiment surveys, where many participants indicated that this high-delay, long-pulse width signals felt like a bug was crawling up their arm and induced a creepy sensation.

We ran a four-way repeated measures ANOVA on the pleasantness ratings with arm location, vibration presence, delay, and pulse width as factors. This analysis showed that pleasantness ratings were not statistically different based on arm location ($p=0.70$) or vibration condition ($p=0.16$).

Pleasantness slightly increases from 12.5% to 25% delay, but the change is not significant ($p=0.99$). Pleasantness then steadily decreased with increasing delay. Across all delay values, the pleasantness ratings were not statistically significant for adjacent delays ($p>0.05$), but all other comparisons were statistically significant. This shows that pleasantness is strongly linked to actuator delay, but small changes in delay do not have a significant effect.

For pulse width, the pleasantness ratings for 200 ms were significantly lower than the pleasantness ratings of the three higher pulse widths (p<0.05). However, the three highest pulse widths (400 ms, 600 ms, 800 ms) were not statistically different amongst themselves (p>0.96).

We ran one-sample t-tests on the pleasantness ratings grouped by delay value to compare the actual ratings to a neutral rating (Pleasantness=0). The pleasantness ratings for the four shortest delay values (12.5%, 25%, 37.5%, 50%) were statistically greater than zero ($p<2\times10^{-4}$), which indicates that these conditions were on average rated as pleasant. The pleasantness ratings for the two longest delay values (62.5%, 75%) were not statistically greater than zero (p>0.05). None of the delay values were rated as statistically less than zero (unpleasant).

We also ran one-sample t-tests on the pleasantness ratings grouped by pulse-width values to compare the actual ratings to a neutral rating. The pleasantness ratings for all pulse width values (200 ms, 400 ms, 600 ms, 800 ms) were statistically greater than zero ($p<9\times10^{-4}$), which shows that all pulse widths were on average rated as pleasant.

B3c) Discussion

The results of this study indicated that the perceived continuity of the stroke sensation increases with pulse width and decreases with delay. These observed trends were consistent across all of the tested actuation parameters. The results also indicated that the pleasantness of the interaction is highest for short delays and increases with pulse width for these values. Therefore, to create a continuous and pleasant sensation, the device should be controlled with a short delay and long pulse width. The signal that was rated highest for continuity was the same as the signal rated highest for pleasantness (800 ms, 12.5% delay). Interestingly, the effective speed of travel of the sensation up the arm for this signal was 13.5 cm/s, which is just slightly above the optimal range for activating the CT afferents.

The added vibration had a positive effect on continuity, but did not significantly affect the perceived pleasantness of the signals. This result proves the effectiveness of our vibration scaling scheme for creating tactile flow and also supports our decision to use data-driven vibrations rather than simple sinusoidal vibrations. Since the vibrations had only a positive effect on our metrics, they should be included as part of the actuation.

Participants rated the signals as more continuous when felt on their lower arm than on their upper arm. However, there was no difference in pleasantness between the two arm locations. One possible explanation for this discrepancy could be that the contact between the tactors and skin was not consistent at the different arm locations due to variations in arm shape. A second possible explanation could be differences in the perception of the lower and upper arms. The CT afferents have been studied extensively in the lower arm, but not much is known about their response to stimuli in the upper arm. In terms of wearability, participants did not express a preference for wearing the sleeve on their lower or upper arm, but a sleeve on the upper arm might be less obtrusive and easier to conceal under clothing if the device were to be worn in everyday life.

B4) Conclusions

We presented the design and evaluation for a device that creates a stroking sensation on the arm using sequential indentation of the skin. The device includes a linear array of voice coils that is worn in a sleeve on the arm. The voice coils are controlled to indent the skin in a linear pattern to create the sensation of a stroking motion even though only normal force is applied. We evaluated the device with a human-subject study and determined that each individual indentation should have a long pulse width (800 ms) and there should be a short delay between the start of indentation for adjacent actuators (12.5% of pulse width) in order to maximize both the perceived continuity and pleasantness of the interaction.

This device could be used for social haptic applications or extended to information transfer or navigation applications. The study in this work showed that a sensation of lateral flow can be generated using only normal force. This result has important implications for actuator design and selection because it is important to minimize the number of degrees of freedom of actuation in order to maximize wearability.

C) Experimental Demonstration—Normal+Lateral Forces

C1) Introduction

As a follow-up to the work of section B, here we consider discrete lateral skin-slip as an alternative stimulation approach because it can combine the benefits of direct lateral motion and illusory lateral motion.

This section includes two main contributions. First, we present the design of a novel haptic device for creating a stroking sensation on the arm using discrete lateral skin-slip. The device, schematically shown on FIG. 9, includes a linear array of motors with a tactor, which sequentially provide skin-slip along the arm. Second, we identify device actuation signal parameters that result in continuous and pleasant sensations through a human-subject study. This section is organized as follows. In Section C2 we discuss some of the parameters involved in the perception of skin-slip, as well as previous devices that use either physical motion or haptic illusions to create a stroking sensation. Section C3 presents the design and control of our sequential skin-slip device, and Section C4 evaluates the continuity and pleasantness of the stroking sensations created by the device in a human-subject study. In Section C5, we discuss an open response experiment that we conducted to understand the effect of spacing between skin contact points on the perceived sensation. Finally, Section C6 concludes with a summary of findings.

C2) Background

Understanding how humans sense lateral motion on the skin is the first step toward creating a haptic device that can realistically mimic these complex sensations. This understanding of perception is even more important when designing a haptic illusion to fool the sense of touch, as we present in this work. Humans sense touch through specialized cells embedded in the skin called mechanoreceptors, which each sense and respond to a specific type of haptic stimulus. The mechanoreceptors in glabrous (non-hairy) skin are the Pacinian corpuscles, Merkel disks, Ruffini endings, and Meissner corpuscles. It is known that Meissner corpuscles respond to skin deformation such as skin-slip. However, the presence and distribution of mechanoreceptors differ in hairy and non-hairy skin. Research has shown that Meissner corpuscles do not exist in hairy skin; instead there exists a different mechanoreceptor, the C tactile (CT) afferent. The CT afferents selectively respond to stroking motions and respond maximally to stroking in the range of 1-10 cm/s, which has also been shown to be the most pleasant range of velocities for stroking on the skin. CT afferents can respond to indentation forces in the range of 0.3-2.5 mN and indentations of 1.5 mm. We designed our haptic device such that the discrete lateral skin-slip will be driven by parameters that address these characteristics of CT afferents.

Several haptic devices have previously been created to display a stroking sensation using a range of different modalities of haptic stimulation using physical motion. One research group has explored directly stimulating the skin with lateral motion provided by a servo motor, and another has used parallel bars controlled to create lateral movement with shape memory alloy (SMA) actuators. Unfortunately, the stroke lengths for each of these techniques is extremely short, 1 cm and 1 mm respectively. Slightly more abstract but still relying on physical motion, a group of researchers has created a stroking sensation via indirect contact with the skin using an air jet. The desire to increase the overall stroke length of a sensation and reduce the complexity of the mechanical design serves as strong motivation for the use of haptic illusions instead of relying on mechanical lateral motion, as in these devices.

Due to the limitations of physical motion created by mechanical devices, researchers have begun to investigate the use of haptic illusions to create a stroking sensation in hairy skin. Likely inspired by the concept of sensory saltation, the illusion of motion across the skin has been created with vibration, which has then in turn been used to simulate a stroking sensation for social touch applications. Although the CT afferents are not as well understood as the mechanoreceptors in the glabrous skin, previous researchers have shown that vibrations, air puffs, and thermal displays can be used to elicit a response, even though these modalities do not directly stimulate the CT afferents via a stroking sensation. Our previous work also attempts to elicit a response from the CT afferents and create a pleasant stroking sensation using only normal indentation, as described in section B herein. While we cannot confirm that we are activating the CT afferents without using microneurography, we were able to successfully create a stroking sensation with speeds slightly above the range of speeds that is known to stimulate the CT afferents. Given our prior success using only normal indentation, we believe that we can create an even stronger haptic illusion of a continuous linear motion using discrete lateral skin-slip, as it combines the use of direct lateral motion and illusory techniques.

C3) Device Design

This section describes the design and actuation of a world-grounded haptic device that creates continuous linear sensations along the arm using discrete lateral skin-slip. The main focus of our design was to gain an understanding of the skin-slip parameters required to create a continuous and pleasant sensation. Here we discuss the mechanical and mechatronic design of the device and the actuator command signals.

C3.1) Electro-Mechanical Hardware

To identify skin-slip patterns that create a continuous and pleasant sensation for the user, we created a system using a linear array of motors that apply discrete lateral skin-slip to the forearm. Our device contains an array of five Faulhaber 1624E0175 DC motors, each with a quadrature encoder. The motors have a 141:1 gear ratio, which limits the speed of the motors to 92 RPM, while increasing resolution and torque.

Figure 9:
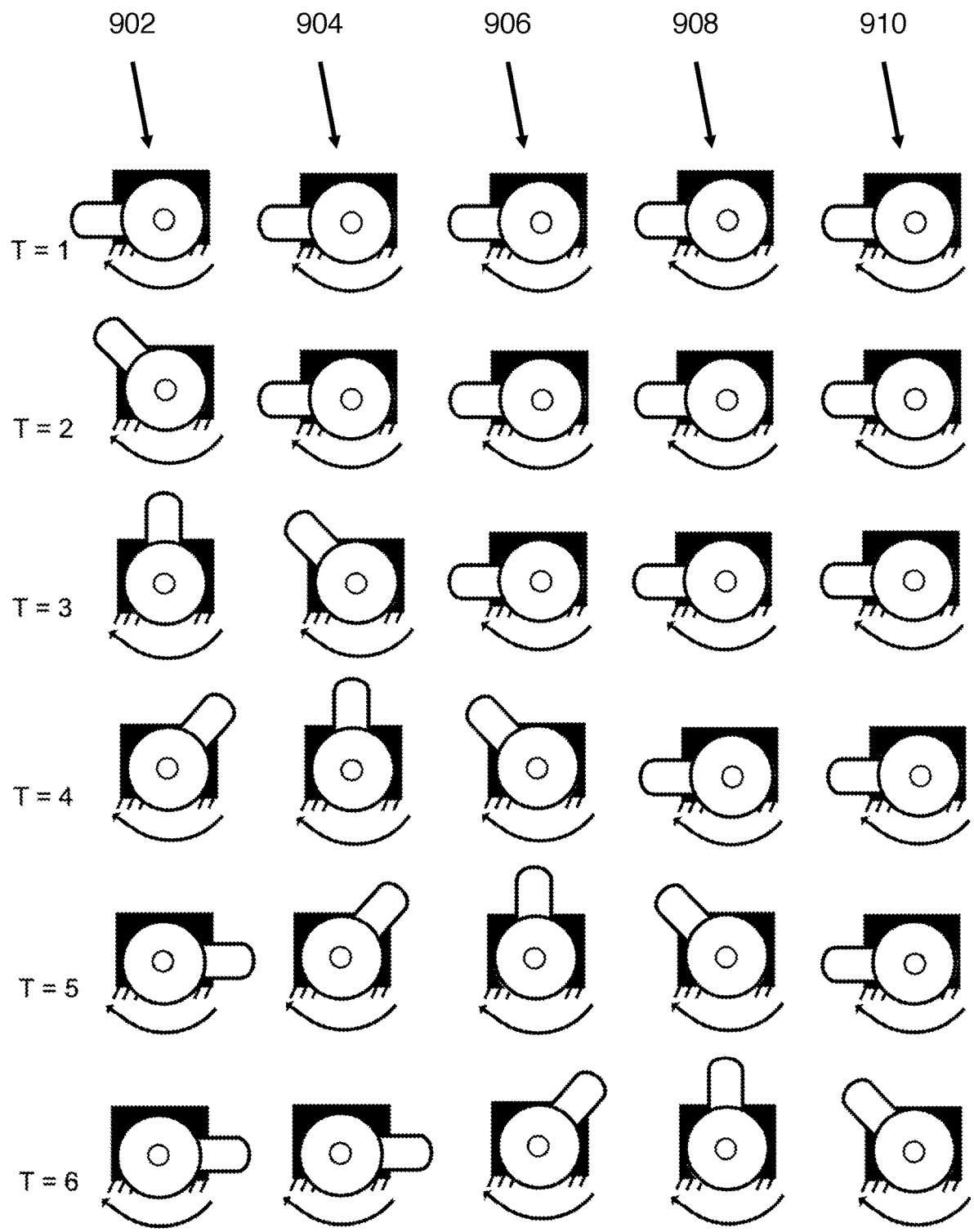
FIG. 9. schematically shows the tactor configuration and operating concept for the experiments of section C.

We attached a rounded tactor to each motor shaft (FIG. 9). The tactor is the element of the device that contacts the skin. It is mounted on the shaft of the motor using a coupler that is press-fit directly onto the shaft of the motor. The other side of the coupler has a + shaped cross-section that prevents the tactor from rotating due to the torque produced by contact with the skin. We iterated through several different tactor designs, varying the roundedness of the tactor edge and the material adhered to the end-effector of the tactor, including silicone and Dycem. After pilot testing to directly compare these different designs, we decided to laser-cut the tactors from ¼-inch acrylic because this material created the most pleasant sensation while ensuring that the interaction produced only skin-slip and not skin-stretch. The motors are mounted in 3-D printed motor holders, or carriages, to firmly fix the round motors in place between two independently adjustable stands, which hold the forearm in place. The stands allow us to align the position of the elbow and the wrist for consistent indentation of tactors 1.5 mm into the user's skin.

C3.2) Actuation Signals

The tactors individually create a short skin-slip sensation on the arm by rotating the motors over a short path. The motors are then actuated one at a time to create a set of sequential skin-slips along the arm, which together create a longer stroking sensation. FIG. 9 shows an exemplary actuation pattern. The feeling of this stroke can be controlled by varying the rotation speed of the tactors and the amount of delay between the onset of rotation for adjacent tactors. A control system, implemented in C++, sets the trajectories of the tactors. The software reads the encoder values from the motors and implements a PID controller to set the position of the tactor. The motors are driven using analog signals from a Sensoray 826 PCI card at 10 kHz via a linear current amplifier. The linear current amplifier was constructed using a power op-amp (LM675T) with a gain of 1 A/V. The Faulhaber motors are rated to a peak current of 10 mA. The described current amplifier circuit provides the necessary current for the motors at the desired voltages without exceeding the maximum output current of the Sensoray board.

Figure 10A:
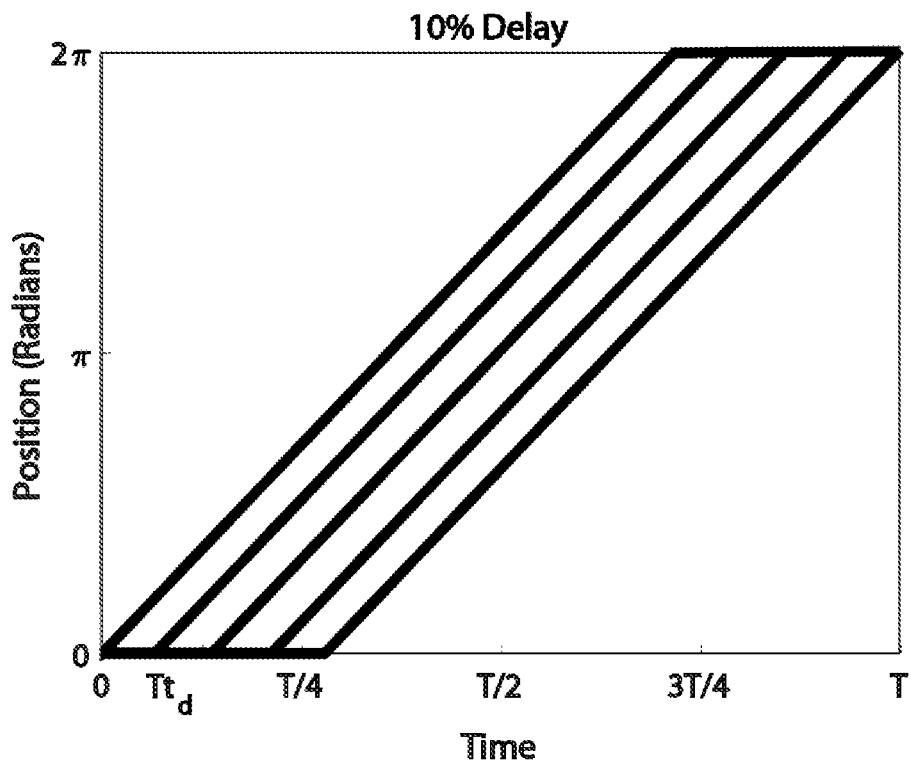
FIGS. 10A-B show the effect of delay on the experiments of section C.
Figure 10B:
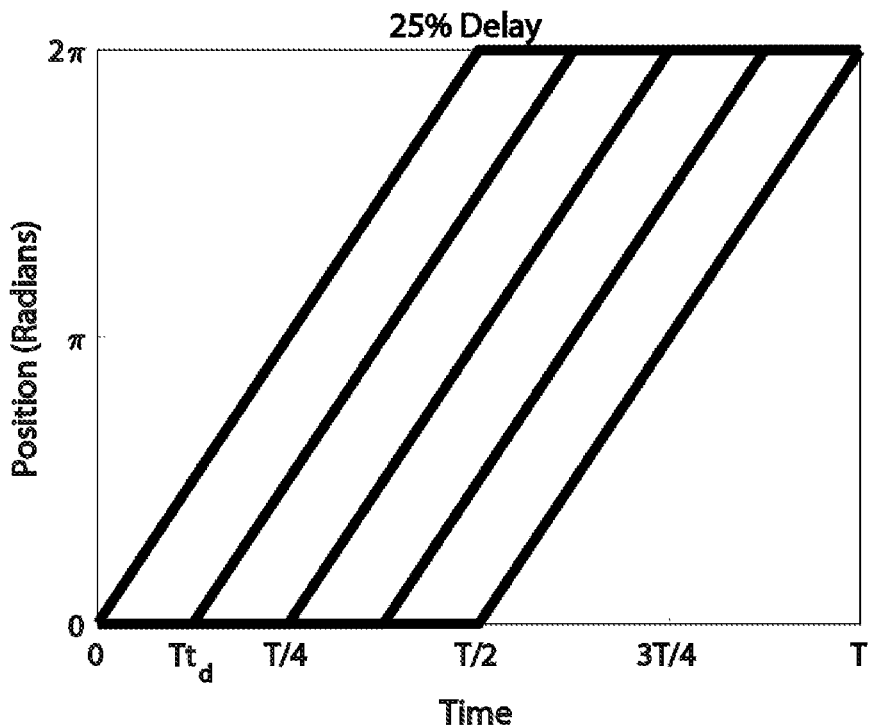

The tactors in the array are sequentially activated using the same signal with a set rotation speed and amount of delay between the onset of rotation for adjacent actuators. The effect of this delay can be seen in FIGS. 10A-B. The signals on FIG. 10A are delayed by 10% of the amount of time to complete a full rotation, which results in overlapping skin contact. The signals on FIG. 10B are delayed by 25% of the amount of time to complete a full rotation, which causes no overlapping skin contact. For each duration of tactor rotation, shorter delays result in more overlap of tactor skin contact and longer delays result in more discrete skin contact. We study the effects of this delay between tactors and the varying speeds of rotation (both local and apparent velocity) on the perceived continuity and pleasantness of the stroke in Section C4.

The CT afferents respond optimally to speeds in the range of 1-10 cm/s. Thus, we quantified the speed of our device on the skin to evaluate how efficient our device is at stimulating the CT afferents. The speed is calculated using the distance that the tactor travels along the skin, which is dependent on several variables, illustrated in FIG. 11. These dependencies include the radius of the rounded tactor tip that is in contact with the skin, $R_s$, the radius of the trajectory from the center point to the rounded top, $R_L$, and the distance from the center of rotation to the skin, H. The vertical contribution of the movement, y, is described by the following equation:

$$y = R_L \cos \theta \tag{B1}$$

When the tactor is leaving the skin, the following condition must hold:

$$H = y + R_s \tag{B2}$$

Given this constraint, we can calculate the corresponding horizontal contribution, x (Eq. B3), and the associated angle θ (Eq. B4).

$$x = R_L \sin\left(\cos^{-1}\left(\frac{H - R_S}{R_L}\right)\right) \quad (B3)$$

$$\theta = \cos^{-1}\left(\frac{H - R_S}{R_L}\right) \quad (B4)$$

The total movement of the tactor along the skin is, consequently, equal to 2x. For our tactor specifications, that means that one actuator travels 1.0 cm along the skin. The total time, t, that the tactor travels along the skin is dependent on the amount of time for the tactor to complete a full rotation, $T_p$, the delay, d, and the number of tactors, N and can be calculated using the following equation:

$$t = \frac{\theta}{\pi} T_p + T_p d(N - 1) \quad (B5)$$

Here delay is defined as a dimensionless fraction of the rotation period $T_p$.

The speed of the tactor is defined by two parameters, the local speed of the tactor, $v_{local}$, which is the speed of the tactor as it slips along the skin, and the apparent speed, $v_{apparent}$ of the haptic device, which is the average speed of the traveling contact along the arm. The local speed is given by Eq. B6. The apparent speed is related to the distance between the tactors, D, and is given by Eq. B7.

$$v_{local} = \frac{2x}{t} \text{ where } N = 1 \quad (B6)$$

$$v_{apparent} = \frac{2x + D(N - 1)}{t} \quad (B7)$$

The apparent speeds for all combinations of delay and pulse duration are presented in Table 1, along with the local speeds for all conditions (which only vary based on duration of rotation and is not dependent on delay).

TABLE 1

Computed apparent speeds of contact point. All velocities are in cm/s.

| | | $T_p$ (s) | | | | |
|---|---|---|---|---|---|---|
| | delay | 1.0 | 1.5 | 2.0 | 2.5 | 3.0 |
| $V_{local}$ | N/A | 5.3 | 3.6 | 2.7 | 2.1 | 1.8 |
| $V_{apparent}$ | 0 | 48.2 | 32.2 | 24.1 | 19.3 | 16.1 |
| | 0.05 | 23.3 | 15.5 | 11.6 | 10.7 | 7.8 |
| | 0.1 | 15.3 | 10.2 | 7.7 | 6.1 | 5.1 |
| | 0.15 | 11.4 | 7.6 | 5.7 | 4.6 | 3.8 |
| | 0.2 | 9.1 | 6.1 | 4.6 | 3.6 | 3.0 |
| | 0.25 | 7.6 | 5.1 | 3.8 | 3.0 | 2.5 |

The apparent velocity for each duration of rotation is always larger than the local velocity. This is because at delays larger than 30% the tactors trajectories begin overlapping with each other. This could be remedied by either making the distance between tactors larger or decreasing the length of the tactor. We chose to minimize the distance between tactors as we hypothesized that it would create the strongest illusion. While we could have designed shorter tactor tips, it would bring the forearm closer to the motor shafts. Decreasing the length in the tactor increases the chance that the forearm could contact the motors which would obscure the sensation of the skin-slip.

C4) User Study

To identify actuation parameters that create a continuous, pleasant sensation, we ran a study with 16 participants (14 right-handed, 2 ambidextrous; 11 male, 5 female; aged 20-48). Ten participants were very familiar with haptic devices and six were not. The protocol was approved by the Stanford University Institutional Review Board, and all participants gave informed consent.

C4.1) Methods

Participants sat at a table and placed their right wrist and elbow onto the haptic device. The participants had their arm at their side and faced forward, so they were unable to see the motors and tactors. The participants wore headphones playing white noise to block sounds produced by the motors.

Participants completed the study with two contact locations: (1) with the tactors contacting the underside (volar side) of their forearm and (2) with the tactors contacting the top side (dorsal side) of their forearm. The first contact location for each participant was pseudo-random and balanced across participants to mitigate any order effects. Before beginning the study, we aligned the participants' elbow and wrist to ensure the tactors would indent 1.5 mm into the skin.

In the study, we varied the duration of tactor rotation (1.0, 1.5, 2.0, 2.5, and 3.0 seconds) and the amount of delay between actuators (0%, 5%, 10%, 15%, 20%, and 25% of rotation duration) so that we could understand the effects of both local and apparent velocity (Table 1). This resulted in 30 unique actuation conditions, each of which was displayed twice. The order of conditions was randomized, and participants completed all 60 trials for one forearm location before switching to the next location. Each participant completed a total of 120 trials broken into 4 blocks of 30 trials. Between each of the blocks, participants were given a 2 minute break and the tactors were realigned. Participants were allowed to repeat the sensation as many times as desired. On average, participants completed the study in under 1 hour.

After feeling each condition, participants rated the sensation on its perceived continuity and pleasantness. Participants rated continuity using a 7-point Likert scale (1=Discrete and 7=Continuous). Similarly, they rated pleasantness on a Likert scale ranging from −7 to +7 (−7=Very Unpleasant, 0=Neutral, +7=Very Pleasant). After completing all 120 trials, participants completed a post-study survey which asked participants to rate using a 7-point Likert scale how difficult it was to distinguish sensations between trials, whether it was easier to distinguish between sensations on the volar or dorsal forearm, and if the sensations felt stronger on the volar or dorsal forearm and were also given space to provide any additional comments.

C4.2) Results

Figure 12:
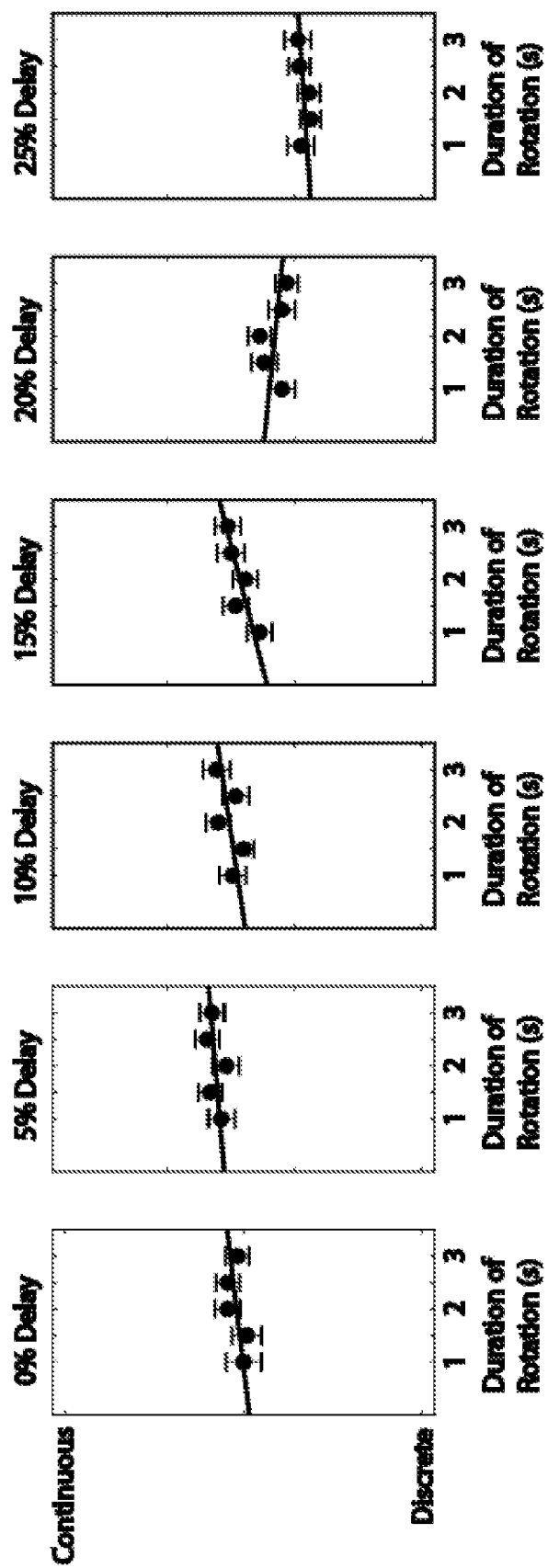
FIG. 12 shows continuity results for the experiments of section C.

FIG. 12 shows the average continuity rating across all participants, separated by delay and pulse duration. We fit a linear regression to the average continuity ratings for each delay. The positive slope values of the fitted regressions indicated that rated continuity increases with increasing pulse value when delay is held constant. Similarly, from looking at the decreasing intercepts and slopes of the fitted regressions, it can be seen that continuity decreases with delay.

We ran a three-way repeated measures ANOVA on the continuity ratings with forearm location, delay, and pulse duration as factors. This analysis showed that there was no significant difference in continuity ratings between the volar and dorsal forearm (F(1)=2.64, p=0.105).

Continuity was significantly different across delays ($F(5)=89.41$, $p=1.12\times10^{-84}$). To further evaluate the effect of delay, we ran a post-hoc pairwise comparison test with a Bonferroni correction. For smaller delays (0%, 5%, 10%), continuity values were generally not significantly different from the continuity values of the adjacent delays. However, for larger delays, (15%, 20%, 25%), continuity values were generally significantly different from the continuity values of the adjacent delays. This shows that while continuity is strongly linked to the delay between the onset of actuation, small changes in delay do not have a significant effect on the sensation at small delay values. However, beginning at 15%, small changes in delay have a significant effect at large delay values and the sensation feels less and less continuous.

The results of the ANOVA showed that continuity was significantly different across duration of rotation ($F(4)=2.64$, $p=0.033$). However, we ran a post-hoc pairwise comparison test with a Bonferroni correction to further evaluate the effect of the duration of rotation and found that continuity ratings were not statistically significantly different for any of the pairs of pulse durations. These results show that perceived continuity of the sensation varies and can be controlled by changing the delay of the onset of actuation between motors, regardless of the chosen arm location or pulse duration. Further, these results show that differences in perceived continuity are due to changes in the apparent velocity, and not to changes in the local velocity.

Figure 13:
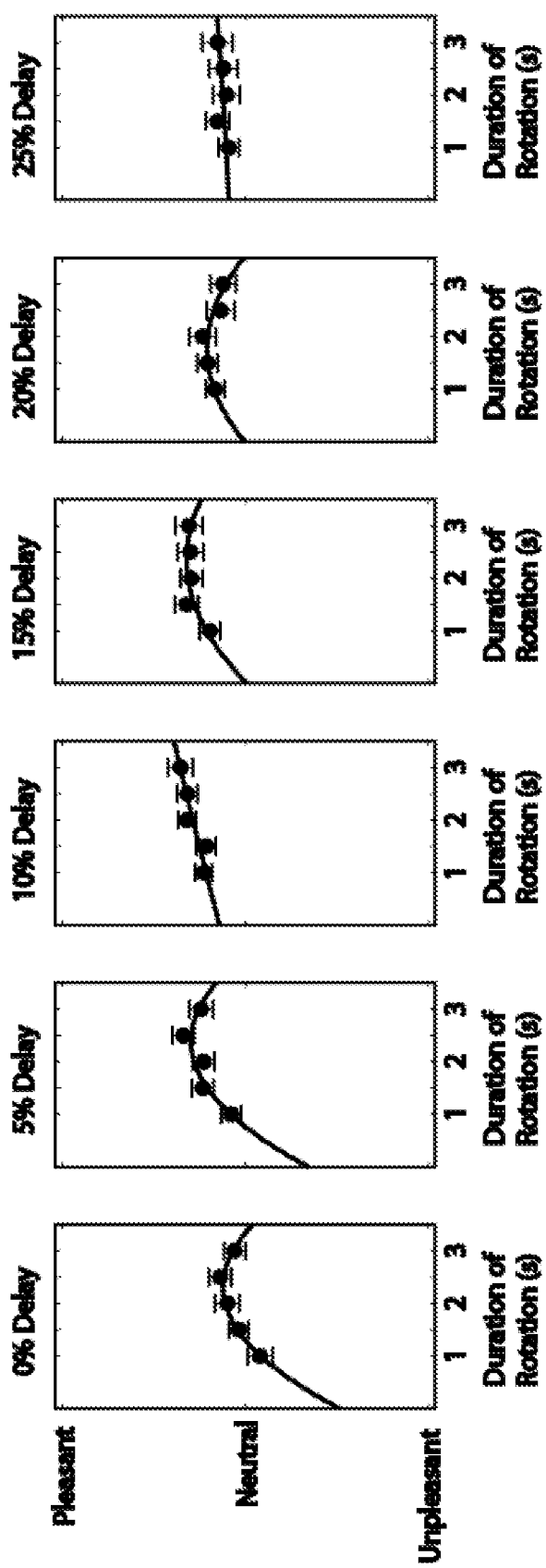
FIG. 13 shows pleasantness results for the experiments of section C.

FIG. 13 shows the average pleasantness rating across all participants, separated by delay and pulse duration. We applied a quadratic regression to the data, following previous studies that identified this as an appropriate model for pleasantness. The plot indicates that pleasantness is highest for the middle rotation times (1.5, 2.0, and 2.5 s with local speeds of 3.6, 2.7, and 2.1 cm/s, respectively) when delay is held constant. The pleasantness also follows a similar parabolic fit pertaining to delay. Initially the ratings increase with increasing delay and peak at 10% and 15% before decreasing.

Similar to our analysis for continuity, we ran a three-way ANOVA on the pleasantness ratings with forearm location, delay, and pulse duration as factors. Unlike our analysis for continuity, this analysis showed that pleasantness ratings were statistically different between the volar and dorsal forearm ($F(1)=10.56$, $p=0.001$). From these results, we can conclude that the bottom of the forearm is more pleasant than the top of the forearm.

Pleasantness is also statistically different for delay ($F(5)=17.24$, $p=1.03\times10^{-16}$). We ran a post-hoc pairwise comparison test with a Bonferroni correction to further evaluate the effect of delay. These results show that the ratings follow a parabolic trend, as the medial values (10%, 15%) are not statistically significantly different from each other, but are different from the values on the ends (0%, 25%). This corresponds with what we see in the data that the values peak at 10% and 15%.

The results of the ANOVA showed that pleasantness was significantly different across duration of rotation ($F(4)=9.19$, $p=2.38\times10^{-7}$). After running a post-hoc pairwise comparison test with a Bonferroni correction, we found that the pleasantness ratings for a rotation duration of 1.0 s (5.3 cm/s) were significantly less than the pleasantness ratings of all of the other pulse durations. However, the pleasantness values for the other four durations of rotation (1.5, 2.0, 2.5, and 3.0 s with local speeds of 3.6, 2.7, 2.1, 1.8 cm/s, respectively) were not statistically significantly different from each other.

To determine if the sensations were actually perceived as pleasant, we ran one-sample t-tests on the pleasantness ratings compared to the neutral rating (pleasantness=0). When we grouped the pleasantness ratings by delay, the delay values of 5%, 10%, 15%, 20%, and 25% had ratings that were statistically greater than zero ($p \leq 7\times10^{-5}$). This indicates that these conditions were on average rated as pleasant. The pleasantness ratings for the smallest delay value, 0% delay, was not statistically different from zero ($p=0.12$). We did not find that the pleasantness ratings were significantly less than zero (unpleasant) for any of the delay values. When we grouped the pleasantness ratings by the duration of rotation, all of the values (1.0, 1.5, 2.0, 2.5, and 3.0 s with local speeds of 5.3, 3.6, 2.7, 2.1, and 1.8 cm/s, respectively) were statistically greater than zero ($p \leq 0.002$). This indicates that these conditions were on average rated as pleasant.

C4.3) Discussion

This analysis shows how to design signals for the actuation of a discrete lateral skin-slip device. To optimize for a continuous sensation, with our device one should command the motors with minimal delay, such as 5%, and maximal duration of rotation, such as 3.0 s (1.8 cm/s). This combination corresponds to an apparent velocity of 7.8 cm/s. To optimize for a pleasant sensation, with our device the motors should be commanded via the medial delay values, either 10% or 15%, with a medial duration of rotation, such as 2.0 s (2.7 cm/s). These combinations correspond to apparent velocities of 7.7 cm/s and 5.7 cm/s.

The signal that was rated highest for continuity was 10% delay with a duration of 2.0 s on the dorsal forearm. The effective speed of travel of the sensation along the forearm was 7.7 cm/s, which is within the optimal range of 1-10 cm/s for activating the CT afferents. The signal that was rated highest for pleasantness was 10% delay with a duration of 3.0 s on the volar forearm. The effective speed of travel of the sensation along the forearm was 5.1 cm/s, which is also within the optimal range for activating the CT afferents. As previously mentioned, we initially piloted illusory strokes with slower speeds closer to 1 cm/s, but they felt unpleasant. From the parabolic results of our study, we can determine that the perception of touch is more continuous and pleasant when the speed is closer to 10 cm/s than to 1 cm/s. Thus, when creating future haptic devices that involve continuous linear sensations, designers should more specifically focus speeds of 5-10 cm/s for it to be perceived most optimally as continuous and pleasant.

Participants' ratings for continuity did not vary significantly between the volar and dorsal forearm. However, their ratings for pleasantness did differ between the two forearm locations. We believe that the reason that there was a difference in pleasantness ratings but not continuity ratings is likely from the design of the device and not human perception. Specifically, although we made the device adjustable, it is possible that tactor contact with the skin was different for the two locations due to the different shape and musculature of the forearm. Additionally, in a post-study survey, subjects reported that they preferred to feel the sensation on their volar forearm and felt more comfortable resting their arm in that position than their dorsal forearm. User comfort could be the reason for higher pleasantness ratings for the volar forearm compared to the dorsal forearm. Furthermore, even though the overall pleasantness values were statistically different for the volar and dorsal forearm, the trends across delays and duration of rotation were consistent for the two locations.

Although the average ratings for continuity and pleasantness were not exceptionally high, it is still clear that the device was able to generate a continuous and pleasant linear sensation and that this type of actuation could be successful as part of a wearable haptic device. We believe that because we did not allow the subjects to feel any of the parameters or undergo any training trials prior to the experiment that their responses were not necessarily based on whether or not the sensation felt continuous and pleasant, but how continuous and pleasant the sensation felt in comparison to previous sensations. We also believe that there was inherent variation in the rating methodology between subjects, with some drastically fluctuating from trial to trial and others generally staying close to neutral responses, likely pulled the average values closer to the center. Since our participants were able to see the device before completing the study, we also believe that there is an artificial maximum pertaining to the continuity values. We believe that participants never rated continuity with a 7 because the participants knew in advance that the sensation would not be one continuous motion. In future work, we believe that we could remove this inherent bias by either not allowing the user to see the device in advance of the study or by comparing this sensation to an actual continuous motion (such as a robotic finger dragging along the skin).

We cannot directly compare these results using discrete lateral skin-slip to our previous work using normal indentation (section B) because we used a different set of participants in the two studies. However, our average continuity and pleasantness ratings are in the same range as those from the normal indentation study. In fact, we had fewer average pleasantness ratings less than 0 and several average pleasantness ratings that were higher than what was collected for the normal indentation study at the same speeds. Therefore, we can confirm that our hypothesis that discrete lateral skin-slip, which combines normal indentation and lateral motion, creates a stronger illusion than normal indentation alone. In future work, we are interested in conducting a study to directly compare normal indentation, discrete lateral skin-slip, and skin stretch to further understand and characterize the parameters of these actuation methods.

These results provide general models that can be used as guidelines for rendering lateral sensations on the forearm using discrete lateral skin-slip. The results from this study show promise towards creating sensations that could be applicable for social touch (strokes to show comfort or excitement for example), to relay effective directional cues, or other simple messages.

These results also led us to question another extremely important parameter in wearable haptics design: the spacing of skin contact points. Were we only able to successfully create this illusion because our contact points were spaced closely together? Can we spread those contact points further apart and still get similar results? How many contact points are necessary to create the illusion? Can we have fewer contact points and still get similar results? We address some of these questions with the open response experiment described next in Section C5.

C5) Open Response Contact Spacing Study

To investigate the effect that spacing between contact points has on creating a continuous, pleasant sensation, we conducted an open response study with 4 subjects (all right-handed; 2 male, 2 female; aged 21-32). All 4 subjects were familiar with haptic devices, but none of the subjects had any previous experience with this haptic device or participated in the previous study. The protocol was approved by the Stanford University Institutional Review Board, and all subjects gave informed consent.

C5.1) Methods

Subjects sat at a table and placed their wrist and elbow in a position which matches the positioning from the above user study for the tactors contacting the volar forearm. The participants were blindfolded and wore noise-canceling headphones playing white noise so that they could not see or hear the motors and tactors, nor see what changes were being made to the system during the study.

The user study described in Section C4 showed that there was no significant difference in continuity between the dorsal and volar forearm, but that the sensations felt on the volar forearm were significantly more pleasant that those felt on the dorsal forearm. Additionally, users reported feeling more comfortable using their volar forearm to interact with the device than with their dorsal forearm. Thus, we chose the underside of the forearm as the contact location for the open response study.

Spacing between contact points in this investigation is defined as the distance between the centers of the shafts of the motors. In the previous user study, the contact points of the tactors were equally spaced every 20 mm and thus, 20 mm spacing was used as the baseline for the open response study. Since we were interested in the effect that increased distance between contact points would have on the sensation, we varied the spacing of the contact points between 20, 30, 35, and 40 mm. While the original design of the haptic device used in the previous user study consisted of an array of five Falhauber motors, we adapted the haptic device to be an array of four motors such that the device could still fit within the workspace (volar forearm) when increasing the spacing. In using four motors instead of five we were also able to gain some insight pertaining to the effect that the number of contact points has on the sensation. In order to be able to quickly and accurately change the spacing between contact points, we designed and laser cut motor spacers out of ¼-inch acrylic that are inserted between and around the motor carriages during each trial.

While the local velocity remained at 1.8 cm/s between conditions, the apparent velocity varied as the distances between tactors increased. Using the equations from Section C5, we calculated the apparent velocities using the new distances.

The open response paradigm for each subject consisted of 4 trials corresponding to the four contact spacing points. The sequence order for the contact spacing followed a Latin Square Design. To begin each trial, the device was actuated twice, with one second between the actuations, using the baseline distance. Subjects could ask to repeat the stimulation until they were ready to move to the second half of the trial. Then, the spacing between actuators was changed in accordance with the Latin Squares Design and the device was again actuated twice with one second between each actuation and could be repeated as many times as the subject desired. The actuation parameters for both parts of all trials were a delay of 10% and duration of rotation of 3.0 s, because that was rated the highest for pleasantness. To ensure that the subject could not tell which parameters were changed if a parameter was changed between the trials, we enforced a 90 second break between sets before starting the second set and made random movements and noises just in case the subject could still discern differences even with the blindfold and noise-canceling headphones.

The subjects were informed that they would feel a sensation relayed to them twice and then they would feel another sensation relayed to them twice. While it was communicated that we would be changing different parameters of the device throughout the study, we did not specify to the subjects what those parameters would be. The motor carriage dividers were hidden out of sight. Subjects were told that we may or may not change a parameter between the sets of sensations. After feeling both sensations, subjects were asked to describe each sensation in as much detail as possible and also to describe any similarities or differences between the two. On average, subjects completed the open response study in 30 minutes.

B5.2) Results

All subjects described the sensations as moving up the arm. One explicitly stated that it felt "continuous", while the others implied that it felt continuous via their descriptions (such as calling it a smooth movement or sliding along the skin). Similarly, all subjects described the sensations as feeling pleasant. Again, one subject used the word "pleasant" to describe the sensations, while the other subjects implied it via their descriptions. One subject stated that the sensation felt like human touch.

In general, subjects were unable to vocalize differences between first and second actuations in a trial or any differences between the sensations they felt across all trials. None of the subjects were able to identify that we were changing the distances between the contact points. Subjects felt as though maybe there were differences between the sensations but couldn't quite identify what felt different. Some subjects thought that maybe there was a difference in the speed of the movement and others thought that the width (not length) of the sensation varied.

C5.3) Discussion

The results of this study further demonstrate that we can create a pleasant, continuous linear sensation using discrete lateral skin-slip. These results also indicate that there is a negligible change in the sensation by increasing the distance between contact points on the skin.

Although we hypothesized that the illusion of a continuous lateral motion would disappear the further apart the contact points separated, subjects still felt that the sensation was continuous and pleasant even at double the distance apart than the original study and with one fewer contact point. A previous investigation showed that the sensitivity to two-point light touch stimuli on the forearm averaged between 30.7-35.9 mm, and so we believed that subjects should begin to notice a difference using spacing of 30, 35, and 40 mm. However, we hypothesize that because we are creating a more complex sensation than what is done in a two-point discrimination test, the absolute threshold must be larger than the distance values that we were testing. Future work must be done in order to determine that threshold specifically.

Similarly, future work must also be done to determine the minimum number of contact points that are necessary in order to still feel the illusion of a continuous and pleasant linear sensation. The voice coil haptic device used in our previous work on normal skin indentation had six contact points to create a continuous stroking sensation. Our investigation has shown that fewer contact points spaced further apart can still create a pleasant, continuous linear sensation. This information is important for the design of wearable haptics because less actuators can be used which can reduce both the size of the device and the amount of power needed to actuate the device.

As mentioned in Section C5.1, we guaranteed a consistent break of 90 seconds between sets and trials for all subjects. In order to determine this time, we timed how long it took to adjust the motors during pilot tests. We chose the minimum amount of time that we believed we could effectively change the spacing between the motors. Although we attempted to minimize the amount of time between sensations, it is possible that it still exceeded the subjects' haptic memory. Previous studies have shown that subjects can correctly identify objects via active exploration and haptic recognition, but that their accuracy in doing so decreases over time.

We found the comments regarding feeling different widths of the sensation to be particularly interesting and began to think of another parameter that would be important to investigate: contact area. Although a literature report states that CT afferents respond equally well to pin pricks and smooth probe indentations, we are curious how the CT afferents respond to varying sizes of the contact area. Would we be able to create these illusions of continuous linear sensations using much smaller contact areas, like that of a pin head or smooth probe? We think that further analysis of the effect that contact area has on creating this illusion will also prove to be extremely beneficial for the future design of wearable haptic devices.

As mentioned previously, the apparent velocity of the tactors did change from condition to condition. One subject correctly ascertained that the 40 mm condition (9.7 cm/s) felt "faster" than the 20 mm condition (5.1 cm/s). We hypothesize that they detected the change in apparent velocity. Consequently, in a future experiment we will perform the open response study where the distance between tactors changes but the apparent velocity remains constant.

C6) Conclusions

In this section we presented the design and evaluation of a device that creates a pleasant, continuous linear sensation on the forearm using discrete lateral skin-slip. Users place either their volar or dorsal forearm into the world-grounded haptic device comprised of a linear array of motors which rotate to provide discrete lateral skin-slip. We first conducted a human-subject study to investigate the affect that the delay between the onset of actuation of the motors and the pulse duration has on the sensation. We found that to optimize for a continuous sensation, one should command the motors with minimal delay and maximal pulse duration. To optimize for pleasantness, one should command the motors with medial delay values and a medial pulse time. We then conducted a follow-up study in the form of an open response study to investigate the effect that spacing between contact points has on the illusion of a continuous stroking sensation. Subjects were unable to discern any difference in the sensation, even when the spacing between contact points doubled. In future work, we will work to determine the threshold for spacing between contact points and also the effect that skin contact area has on the sensation.

It is possible that the values for continuity are artificially low because participants are able to see that the device was composed of separate actuators. In future work, we will explore the extent of the illusion by performing a study with blinded participants comparing a device that actually performs continuous skin slip along the skin and the discrete device presented here.

The results from this work show that it is possible to effectively create an illusory sensation of continuous lateral motion using discrete lateral skin-slip. This actuation method could be used to relay simple messages, including those pertaining to social touch and navigation. The results obtained during our investigations will help to inform the design of future wearable haptic devices and could help to reduce the overall size and mechanical complexity. Although our device was world-grounded and used large motors, the principles of discrete lateral skin-slip could be applied to a body-grounded wearable device with smaller actuators. The main requirements of these actuators would be to provide at least 0.3 mN of normal force and 1.5 mm of normal indentation that transitions to skin-slip with an apparent velocity≈5-8 cm/s, as calculated using at least 4 contact points equally spaced no more than 40 mm apart.

Large arrays of actuators have the potential to be used to deliver haptic sensations on locations all over the body. However, rendering and control methods for actuating these arrays is still unclear. This work introduces a rendering algorithm to create convincing stroking sensations using skin-slip that could be used for portable and wearable devices. Additionally, the presented results provide a framework for designing a wearable device to perform skin-slip on the forearm. Further, the work and methods from this investigation can be extended to understand this form of feedback on other locations on the body.

The invention claimed is:

1. A haptic feedback apparatus for providing a sensation of continuous lateral motion, the apparatus comprising:
   a linear array of three or more tactors, wherein each tactor is configured to provide a normal force to a user's skin;
   a tactor controller configured to provide drive signals to the tactors to generate the sensation of continuous lateral motion along a length of the linear array of tactors;
   wherein a repetition rate of the drive signals is 20 Hz or less.

2. The haptic feedback apparatus of claim 1, wherein each tactor in its resting position is in contact with the user's skin, and wherein an actuation profile of each tactor includes an initial retraction of the actuator away from the user's skin followed by a stimulus motion of the tactor.

3. The haptic feedback apparatus of claim 2, wherein position vs. time of the stimulus motion is a quadratic function of time.

4. The haptic feedback apparatus of claim 2, wherein position vs. time of the stimulus motion is a linear function of time.

5. The haptic feedback apparatus of claim 1, wherein a delay between actuation of adjacent tactors is between 0% and 50% of an actuation profile duration.

6. The haptic feedback apparatus of claim 5, wherein the actuation profile duration is between 0.1 s and 1 s.

7. The haptic feedback apparatus of claim 1, further comprising a wearable elastic member configured to hold the linear array of tactors in contact with the user's skin during operation.

8. The haptic feedback apparatus of claim 1, wherein the haptic feedback apparatus is configured to be installed in an object the user will hold or make contact with in operation.

9. The haptic feedback apparatus of claim 1, wherein the tactor controller is further configured to provide vibratory drive signals to the tactors.

10. The haptic feedback apparatus of claim 1, wherein the tactor controller is configured to provide a single stroke sequence.

11. A haptic feedback apparatus for providing a sensation of continuous lateral motion, the apparatus comprising:
    a linear array of three or more tactors, wherein each tactor is configured to provide both normal and lateral force to a user's skin;
    a tactor controller configured to provide drive signals to the tactors to generate the sensation of continuous lateral motion along a length of the linear array of tactors;
    wherein a repetition rate of the drive signals is 20 Hz or less.

12. The haptic feedback apparatus of claim 11, wherein each tactor is configured as a rotatable cylinder with a ridge on it, and wherein rotation of the rotatable cylinder can bring the ridge into contact with the user's skin to provide both normal and lateral force to a user's skin.

13. The haptic feedback apparatus of claim 12, wherein a delay between actuation of adjacent tactors is between 0% and 50% of an actuation profile duration.

14. The haptic feedback apparatus of claim 13, wherein an actuation profile duration is between 0.1 s and 3 s.

15. The haptic feedback apparatus of claim 11, wherein the tactor controller is configured to provide a single stroke sequence.

* * * * *